United States Patent
Nagaraj et al.

(10) Patent No.: US 10,567,259 B2
(45) Date of Patent: Feb. 18, 2020

(54) SMART FILTER GENERATOR

(71) Applicant: Extreme Networks, Inc., San Jose, CA (US)

(72) Inventors: Manjunath Meda Nagaraj, Bangalore (IN); Imran Ahmed Ishtiaq, Bangalore (IN); Jude Pragash Vedam, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 51 days.

(21) Appl. No.: 15/467,766

(22) Filed: Mar. 23, 2017

(65) Prior Publication Data

US 2018/0109433 A1 Apr. 19, 2018

(30) Foreign Application Priority Data

Oct. 19, 2016 (IN) .............................. 201641035761

(51) Int. Cl.
*H04L 12/26* (2006.01)
*H04L 12/24* (2006.01)
*H04W 24/02* (2009.01)

(52) U.S. Cl.
CPC .......... *H04L 43/12* (2013.01); *H04L 41/0876* (2013.01); *H04L 41/22* (2013.01); *H04L 43/028* (2013.01); *H04W 24/02* (2013.01)

(58) Field of Classification Search
CPC ..... H04L 24/02; H04L 41/0876; H04L 41/22; H04L 43/12
See application file for complete search history.

(56) References Cited

U.S. PATENT DOCUMENTS 5,031,094 A 7/1991 Toegel et al.
5,359,593 A 10/1994 Derby et al.
(Continued)

FOREIGN PATENT DOCUMENTS

CN 101677292 3/2010
EP 2654340 A1 10/2013
(Continued)

OTHER PUBLICATIONS

Qosmos DeepFlow: Subscriber Analytics Use Case, http://www.qosmos.com/wp-content/uploads/2014/01/Qosmos-DeepFlow-Analytics-use-case-datasheet-Jan-2014.pdf, date Jan. 2014, pp. 1-2.
(Continued)

*Primary Examiner* — Khaled M Kassim
*Assistant Examiner* — Thomas R Cairns
(74) *Attorney, Agent, or Firm* — Sterne, Kessler, Goldstein & Fox P.L.L.C.

(57) ABSTRACT

Techniques for implementing a smart filter generator in a visibility network are provided. In one set of embodiments, the smart filter generator can maintain at least one mapping between (1) a first-order parameter found in network traffic replicated from a core network monitored by the visibility network, and (2) a second-order parameter related to the first-order parameter, where the second-order parameter is not found in the network traffic replicated from the core network. The smart filter generator can further receive, from a user, a user-defined packet filter definition comprising a filtering criterion that makes use of the second-order parameter. The smart filter generator can then translate, based on the at least one mapping, the filtering criterion into a version that makes use of the first-order parameter, and can generate a new packet filter comprising the translated version of the filtering criterion.

15 Claims, 6 Drawing Sheets

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sitanizadeh et al. |
| 6,681,323 B1 | 1/2004 | Fontsnesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,086 B2 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,095,738 B1 | 8/2006 | Desanti |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,177,943 B1 | 2/2007 | Temoshenko et al. |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood Smith |
| 7,454,500 B1 | 11/2008 | Hsu et al. |
| 7,483,374 B2 | 1/2009 | Nilakantan et al. |
| 7,492,713 B1 | 2/2009 | Turner |
| 7,506,065 B2 | 3/2009 | LaVigne et al. |
| 7,539,134 B1 | 5/2009 | Bowes |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,329 B1 * | 1/2010 | Fischman ......... G06F 17/30094 707/999.1 |
| 7,647,427 B1 | 1/2010 | Devarapalli |
| 7,657,629 B1 | 2/2010 | Kommula |
| 7,690,040 B2 | 3/2010 | Frattura et al. |
| 7,706,363 B1 | 4/2010 | Daniel et al. |
| 7,716,370 B1 | 5/2010 | Devarapalli |
| 7,720,066 B2 | 5/2010 | Weyman et al. |
| 7,720,076 B2 | 5/2010 | Dobbins et al. |
| 7,746,789 B2 | 6/2010 | Katoh et al. |
| 7,747,737 B1 | 6/2010 | Apte et al. |
| 7,756,965 B2 | 7/2010 | Joshi |
| 7,760,733 B1 * | 7/2010 | Eiriksson ............... H04L 69/324 370/392 |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasralikar |
| 7,835,358 B2 | 11/2010 | Gallatin et al. |
| 7,840,678 B2 | 11/2010 | Joshi |
| 7,848,326 B1 | 12/2010 | Leong et al. |
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,018,943 B1 | 9/2011 | Pleshek et al. |

(56) References Cited

U.S. PATENT DOCUMENTS

| | | | |
|---|---|---|---|
| 8,111,630 B2* | 2/2012 | Kovvali | H04L 67/2842 370/252 |
| 8,208,494 B2 | 6/2012 | Leong | |
| 8,238,344 B1 | 8/2012 | Chen et al. | |
| 8,239,960 B2 | 8/2012 | Frattura et al. | |
| 8,248,928 B1 | 8/2012 | Wang et al. | |
| 8,270,845 B2 | 9/2012 | Cheung et al. | |
| 8,315,256 B2 | 11/2012 | Leong et al. | |
| 8,386,846 B2 | 2/2013 | Cheung | |
| 8,391,286 B2 | 3/2013 | Gallatin et al. | |
| 8,504,721 B2 | 8/2013 | Hsu et al. | |
| 8,514,718 B2 | 8/2013 | Zijst | |
| 8,537,697 B2 | 9/2013 | Leong et al. | |
| 8,570,862 B1 | 10/2013 | Leong et al. | |
| 8,584,226 B2* | 11/2013 | Kudla | H04L 63/0263 726/13 |
| 8,615,008 B2 | 12/2013 | Natarajan et al. | |
| 8,654,651 B2 | 2/2014 | Leong et al. | |
| 8,824,466 B2 | 9/2014 | Won et al. | |
| 8,830,819 B2 | 9/2014 | Leong et al. | |
| 8,873,557 B2 | 10/2014 | Nguyen | |
| 8,891,527 B2 | 11/2014 | Wang | |
| 8,897,138 B2 | 11/2014 | Yu et al. | |
| 8,934,495 B1* | 1/2015 | Hilton | H04L 67/36 370/401 |
| 8,953,458 B2 | 2/2015 | Leong et al. | |
| 9,155,075 B2 | 10/2015 | Song et al. | |
| 9,264,446 B2 | 2/2016 | Goldfarb et al. | |
| 9,270,566 B2 | 2/2016 | Wang et al. | |
| 9,270,592 B1 | 2/2016 | Sites | |
| 9,294,367 B2 | 3/2016 | Natarajan et al. | |
| 9,356,866 B1 | 5/2016 | Sivaramakrishnan et al. | |
| 9,380,002 B2 | 6/2016 | Johansson et al. | |
| 9,479,415 B2 | 10/2016 | Natarajan et al. | |
| 9,565,138 B2 | 2/2017 | Chen et al. | |
| 9,648,542 B2 | 5/2017 | Hsu et al. | |
| 9,930,103 B2* | 3/2018 | Thompson | G06F 9/541 |
| 2001/0049741 A1 | 12/2001 | Skene et al. | |
| 2001/0052016 A1 | 12/2001 | Skene et al. | |
| 2002/0009081 A1 | 1/2002 | Sampath et al. | |
| 2002/0018796 A1 | 2/2002 | Wironen | |
| 2002/0023089 A1 | 2/2002 | Woo | |
| 2002/0026551 A1 | 2/2002 | Kamimaki et al. | |
| 2002/0038360 A1 | 3/2002 | Andrews et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | |
| 2002/0078233 A1 | 6/2002 | Biliris et al. | |
| 2002/0091840 A1 | 7/2002 | Pulier et al. | |
| 2002/0112036 A1 | 8/2002 | Bohannan et al. | |
| 2002/0120743 A1 | 8/2002 | Shabtay et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0188862 A1 | 12/2002 | Trethewey et al. | |
| 2002/0194324 A1 | 12/2002 | Guha | |
| 2002/0194335 A1 | 12/2002 | Maynard | |
| 2003/0023744 A1 | 1/2003 | Sadot et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | |
| 2003/0065763 A1 | 4/2003 | Swildens et al. | |
| 2003/0105797 A1 | 6/2003 | Dolev et al. | |
| 2003/0115283 A1 | 6/2003 | Barbir et al. | |
| 2003/0135509 A1 | 7/2003 | Davis et al. | |
| 2003/0202511 A1 | 10/2003 | Sreejith et al. | |
| 2003/0210686 A1 | 11/2003 | Terrell et al. | |
| 2003/0210694 A1 | 11/2003 | Jayaraman et al. | |
| 2003/0229697 A1 | 12/2003 | Borella | |
| 2004/0019680 A1 | 1/2004 | Chao et al. | |
| 2004/0024872 A1 | 2/2004 | Kelley et al. | |
| 2004/0032868 A1 | 2/2004 | Oda et al. | |
| 2004/0064577 A1 | 4/2004 | Dahlin et al. | |
| 2004/0194102 A1 | 9/2004 | Neerdaels | |
| 2004/0243718 A1 | 12/2004 | Fujiyoshi | |
| 2004/0249939 A1 | 12/2004 | Amini et al. | |
| 2004/0249971 A1 | 12/2004 | Klinker | |
| 2005/0021883 A1 | 1/2005 | Shishizuka et al. | |
| 2005/0033858 A1 | 2/2005 | Swildens et al. | |
| 2005/0060418 A1 | 3/2005 | Sorokopud | |
| 2005/0060427 A1 | 3/2005 | Phillips et al. | |
| 2005/0086295 A1 | 4/2005 | Cunningham et al. | |
| 2005/0149531 A1 | 7/2005 | Srivastava | |
| 2005/0169180 A1 | 8/2005 | Ludwig | |
| 2005/0190695 A1 | 9/2005 | Phaal | |
| 2005/0207417 A1 | 9/2005 | Ogawa et al. | |
| 2005/0278565 A1 | 12/2005 | Frattura et al. | |
| 2005/0286416 A1 | 12/2005 | Shimonishi et al. | |
| 2006/0036743 A1 | 2/2006 | Deng et al. | |
| 2006/0039374 A1 | 2/2006 | Belz et al. | |
| 2006/0045082 A1 | 3/2006 | Fertell et al. | |
| 2006/0143300 A1 | 6/2006 | See et al. | |
| 2007/0044141 A1 | 2/2007 | Lor et al. | |
| 2007/0053296 A1 | 3/2007 | Yazaki et al. | |
| 2007/0171918 A1 | 7/2007 | Ota et al. | |
| 2007/0195761 A1 | 8/2007 | Tatar et al. | |
| 2007/0233891 A1 | 10/2007 | Luby | |
| 2008/0002591 A1 | 1/2008 | Ueno | |
| 2008/0028077 A1 | 1/2008 | Kamata et al. | |
| 2008/0031141 A1 | 2/2008 | Lean et al. | |
| 2008/0089336 A1 | 4/2008 | Mercier et al. | |
| 2008/0137660 A1 | 6/2008 | Olakangil et al. | |
| 2008/0159141 A1 | 7/2008 | Soukup et al. | |
| 2008/0181119 A1 | 7/2008 | Beyers | |
| 2008/0195731 A1 | 8/2008 | Harmel et al. | |
| 2008/0225710 A1 | 9/2008 | Raja et al. | |
| 2008/0304423 A1 | 12/2008 | Chuang et al. | |
| 2009/0135835 A1 | 5/2009 | Gallatin et al. | |
| 2009/0240644 A1 | 9/2009 | Boettcher et al. | |
| 2009/0262745 A1 | 10/2009 | Leong et al. | |
| 2010/0011126 A1 | 1/2010 | Hsu et al. | |
| 2010/0135323 A1 | 6/2010 | Leong | |
| 2010/0209047 A1 | 8/2010 | Cheung et al. | |
| 2010/0228974 A1 | 9/2010 | Watts et al. | |
| 2010/0293296 A1 | 11/2010 | Hsu et al. | |
| 2010/0325178 A1 | 12/2010 | Won et al. | |
| 2011/0044349 A1 | 2/2011 | Gallatin et al. | |
| 2011/0058566 A1 | 3/2011 | Leong et al. | |
| 2011/0211443 A1 | 9/2011 | Leong et al. | |
| 2011/0216771 A1 | 9/2011 | Gallatin et al. | |
| 2012/0023340 A1 | 1/2012 | Cheung | |
| 2012/0103518 A1 | 5/2012 | Kakimoto et al. | |
| 2012/0157088 A1 | 6/2012 | Gerber et al. | |
| 2012/0201137 A1 | 8/2012 | Le Faucheur et al. | |
| 2012/0243533 A1 | 9/2012 | Leong | |
| 2012/0257635 A1 | 10/2012 | Gallatin et al. | |
| 2012/0275311 A1 | 11/2012 | Ivershen | |
| 2013/0010613 A1 | 1/2013 | Cafarelli et al. | |
| 2013/0028072 A1 | 1/2013 | Addanki | |
| 2013/0034107 A1 | 2/2013 | Leong et al. | |
| 2013/0156029 A1 | 6/2013 | Gallatin et al. | |
| 2013/0173784 A1 | 7/2013 | Wang et al. | |
| 2013/0201984 A1 | 8/2013 | Wang | |
| 2013/0259037 A1 | 10/2013 | Natarajan et al. | |
| 2013/0272135 A1 | 10/2013 | Leong | |
| 2013/0275905 A1* | 10/2013 | Bhaskaran | G06F 3/048 715/771 |
| 2014/0016500 A1 | 1/2014 | Leong et al. | |
| 2014/0022916 A1 | 1/2014 | Natarajan et al. | |
| 2014/0029451 A1 | 1/2014 | Nguyen | |
| 2014/0040478 A1 | 2/2014 | Hsu et al. | |
| 2014/0101297 A1 | 4/2014 | Neisinger et al. | |
| 2014/0204747 A1 | 7/2014 | Yu et al. | |
| 2014/0219100 A1 | 8/2014 | Pandey et al. | |
| 2014/0233399 A1 | 8/2014 | Mann et al. | |
| 2014/0321278 A1 | 10/2014 | Cafarelli et al. | |
| 2015/0009828 A1 | 1/2015 | Murakami | |
| 2015/0009830 A1 | 1/2015 | Bisht et al. | |
| 2015/0033169 A1 | 1/2015 | Lection et al. | |
| 2015/0071171 A1 | 3/2015 | Akiyoshi | |
| 2015/0103824 A1 | 4/2015 | Tanabe | |
| 2015/0142935 A1 | 5/2015 | Srinivas et al. | |

(56) References Cited

U.S. PATENT DOCUMENTS

| | | |
|---|---|---|
| 2015/0170920 A1 | 6/2015 | Purayath et al. |
| 2015/0180802 A1 | 6/2015 | Chen et al. |
| 2015/0195192 A1 | 7/2015 | Vasseur et al. |
| 2015/0207905 A1 | 7/2015 | Merchant et al. |
| 2015/0215841 A1 | 7/2015 | Hsu et al. |
| 2015/0256436 A1 | 9/2015 | Stoyanov et al. |
| 2015/0263889 A1 | 9/2015 | Newton |
| 2015/0281125 A1 | 10/2015 | Koponen et al. |
| 2015/0319070 A1 | 11/2015 | Nachum |
| 2016/0087861 A1 | 3/2016 | Kuan et al. |
| 2016/0119234 A1 | 4/2016 | Valencia Lopez et al. |
| 2016/0149811 A1 | 5/2016 | Roch et al. |
| 2016/0164768 A1 | 6/2016 | Natarajan et al. |
| 2016/0182329 A1 | 6/2016 | Armolavicius et al. |
| 2016/0182378 A1 | 6/2016 | Basavaraja et al. |
| 2016/0204996 A1 | 7/2016 | Lindgren et al. |
| 2016/0248655 A1 | 8/2016 | Francisco et al. |
| 2016/0285735 A1 | 9/2016 | Chen et al. |
| 2016/0285762 A1 | 9/2016 | Chen et al. |
| 2016/0285763 A1 | 9/2016 | Laxman et al. |
| 2016/0308766 A1 | 10/2016 | Register et al. |
| 2016/0373303 A1 | 12/2016 | Vedam et al. |
| 2016/0373304 A1 | 12/2016 | Sharma et al. |
| 2016/0373351 A1 | 12/2016 | Sharma et al. |
| 2016/0373352 A1 | 12/2016 | Sharma et al. |
| 2017/0187649 A1 | 6/2017 | Chen et al. |
| 2017/0237632 A1 | 8/2017 | Hegde et al. |
| 2017/0237633 A1 | 8/2017 | Hegde et al. |

FOREIGN PATENT DOCUMENTS

| | | |
|---|---|---|
| EP | 3206344 A2 | 8/2017 |
| EP | 3206345 A2 | 8/2017 |
| IE | 20070438 A1 | 2/2008 |
| IN | 201641010295 | 3/2016 |
| IN | 201641016960 | 5/2016 |
| IN | 201641035761 | 10/2016 |
| WO | WO 2010/017308 | 2/2010 |
| WO | 2010135474 A1 | 11/2010 |
| WO | 2015116538 A1 | 8/2015 |
| WO | 2015138513 A1 | 9/2015 |
| WO | WO 2016/164633 | 10/2016 |

OTHER PUBLICATIONS

Configuring GTM to determine packet gateway health and availability, https://support.f5.com/kb/en-us/products/big-ip_gtm/manuals/product/gtm-implementations-11-6-0/9.html, downloaded circa Mar. 23, 2015, pp. 1-5.

ExtraHop-Arista Persistent Monitoring Architecture for SDN, downloaded circa Apr. 2, 2015, pp. 1-5.

7433 GTP Session Controller, www.ixia.com, downloaded circa Apr. 2, 2015, pp. 1-3.

Stateful GTP Correlation, https://www.gigamon.com/PDF/appnote/AN-GTP-Correlation-Stateful-Subscriber-Aware-Filtering-4025.pdf, date 2013, pp. 1-9.

GigaVUE-2404 // Data Sheet, www.gigamon.com, date Feb. 2014, pp. 1-6.

nGenius Performance Manager, www.netscout.com, date Mar. 2014, pp. 1-8.

GigaVUE-VM // Data Sheet, www.gigamon.com, date Oct. 2014, pp. 1-3.

Unified Visibility Fabric an Innovative Approach, https://www.gigamon.com/unified-visibility-fabric, Downloaded circa Mar. 30, 2015, pp. 1-4.

adaptiv.io and Apsalar Form Strategic Partnership to Provide Omni-channel Mobile Data Intelligence, http://www.businesswire.com/news/home/20150113005721/en/adaptiv.io-Apsalar-Form-Strategic-Partnership-Provide-Omni-channel, Downloaded circa Mar. 30, 2015, pp. 1-2.

Real-time Data Analytics with IBM InfoSphere Streams and Brocade MLXe Series Devices, www.brocade.com, date 2011, pp. 1-2.

Syniverse Proactive Roaming Data Analysis—VisProactive, http://m.syniverse.com/files/service_solutions/pdf/solutionsheet_visproactive_314.pdf.,date 2014, pp. 1-3.

Network Analytics: Product Overview, www.sandvine.com, date Apr. 28, 2014, pp. 1-2.

Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.

Joshi et al.: A Review of Network Traffic Analysis and Prediction Techniques; arxiv.org; 2015; 22 pages.

Anjali et al.: MABE: A New Method for Available Bandwidth Estimation in an MPLS Network; submitted to World Scientific on Jun. 5, 2002; 12 pages.

Cisco Nexus Data Broker: Scalable and Cost-Effective Solution for Network Traffic Visibility; Cisco 2015; 10 pages.

VB220-240G Modular 10G/1G Network Packet Broker; VSS Monitoring; 2016, 3 pages.

Big Tap Monitoring Fabric 4.5; Big Switch Networks; Apr. 2015; 8 pages.

Gigamon Intelligent Flow Mapping—Whitepaper; 3039-04; Apr. 2015; 5 pages.

Ixia White Paper; The Real Secret to Securing Your Network; Oct. 2014; 16 pages.

Accedian—Solution Brief; FlowBROKER; Feb. 2016; 9 pages.

Network Time Machine for Service Providers; NETSCOUT; http://enterprise.netscout.com/telecom-tools/lte-solutions/network-time-machine-service-providers; Apr. 18, 2017; 8 pages.

Arista EOS Central—Introduction to TAP aggregation; https://eos.arista.com/introduction-to-tap-aggregation/; Apr. 18, 2017; 6 pages.

Brocade Session Director—Data Sheet; 2016; https://www.brocade.com/content/dam/common/documents/content-types/datasheet/brocade-session-director-ds.pdf; 5 pages.

Ixia—Evaluating Inline Security Fabric: Key Considerations; White Paper; https://www.ixiacom.com/sites/default/files/2016-08/915-8079-01-S-WP-Evaluating%20Inline%20Security%20Fabric_v5.pdf; 10 pages.

Next-Generation Monitoring Fabrics for Mobile Networks; Big Switch Networks—White Paper; 2014; 9 pages.

Gigamon Adaptive Packet Filtering; Jan. 25, 2017; 3 pages.

VB220 Modular 10G.1G Network Packet Broker Datasheet; VSS Monitoring; 2016; 8 pages.

FlexaWare; FlexaMiner Packet Filter FM800PF; Jan. 27, 2017; 5 pages.

GL Communications Inc.; PacketBroker—Passive Ethernet Tap; Jan. 27, 2017; 2 pages.

International Search Report & Written Opinion for PCT Application PCT/US2017/025998 dated Jul. 20, 2017, 8 pages.

Ixia & Vectra, Complete Visibility for a Stronger Advanced Persistent Threat (APT) Defense, pp. 1-2, May 30, 2016.

Extended European Search Report & Opinion for EP Application 17000212.5 dated Aug. 1, 2017, 9 pages.

Extended European Search Report & Opinion for EP Application 17000213.3 dated Aug. 1, 2017, 7 pages.

International Search Report and Written Opinion for Application No. PCT/US 2017/055191, dated Feb. 14, 2017 (7 pages).

Non-Final Office Action for U.S. Appl. No. 15/043,421 dated Apr. 13, 2016, 18 pages.

U.S. Appl. No. 12/272,618, Final Office Action dated May 5, 2014, 13 pages.

U.S. Appl. No. 12/272,618, NonFinal Office Action dated Jul. 29, 2013, 13 pages.

U.S. Appl. No. 12/272,618, NonFinal Office Action dated Jan. 12, 2015, 5 pages.

U.S. Appl. No. 12/272,618, Notice of Allowance dated Aug. 26, 2015, 11 pages.

U.S. Appl. No. 12/272,618, Final Office Action dated Feb. 28, 2012, 12 pages.

U.S. Appl. No. 13/925,670, NonFinal Office Action dated Nov. 16, 2015, 48 pages.

U.S. Appl. No. 14/230,590, Notice of Allowance dated Sep. 23, 2015, 8 pages.

U.S. Appl. No. 15/043,421, Notice of Allowance dated Jun. 27, 2016, 21 pages.

(56) References Cited

OTHER PUBLICATIONS

U.S. Appl. No. 14/603,304, NonFinal Office Action dated Aug. 1, 2016, 86 pages.
U.S. Appl. No. 14/320,138, Notice of Allowance dated Sep. 23, 2016, 17 pages.
U.S. Appl. No. 14/603,304, Notice of Allowance dated Jan. 11, 2017, 13 pages.
U.S. Appl. No. 14/848,677, NonFinal Office Action dated Feb. 10, 2017, 83 pages.
IBM User Guide, Version 2.1AIX, Solaris and Windows NT, Third Edition (Mar. 1999) 102 Pages.
White Paper, Foundry Networks, "Server Load Balancing in Today's Web-Enabled Enterprises" Apr. 2002 10 Pages.
International Search Report & Written Opinion for PCT Application PCT/US2015/012915 dated Apr. 10, 2015, 15 pages.
Gigamon: Vistapointe Technology Solution Brief; Visualize-Optimize-Monetize-3100-02; Feb. 2014; 2 pages.
Gigamon: Netflow Generation Feature Brief; 3099-04; Oct. 2014; 2 pages.
Gigamon: Unified Visibility Fabric Solution Brief; 3018-03; Jan. 2015; 4 pages.
Gigamon: Active Visibility for Multi-Tiered Security Solutions Overview; 3127-02; Oct. 2014; 5 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Service Provider System Reference Architecture for the Visibility Fabric White Paper; 5004-01; Mar. 2014; 11 pages.
Gigamon: Unified Visibility Fabric—A New Approach to Visibility White Paper; 3072-04; Jan. 2015; 6 pages.
Gigamon: The Visibility Fabric Architecture—A New Approach to Traffic Visibility White Paper; 2012-2013; 8 pages.
Ixia: Creating a Visibility Architecture—a New Perspective on Network Visibilty White Paper; 915-6581-01 Rev. A, Feb. 2014; 14 pages.
Gigamon: Unified Visibility Fabric; https://www.gigamon.com/unfied-visibility-fabric; Apr. 7, 2015; 5 pages.
Gigamon: Application Note Stateful GTP Correlation; 4025-02; Dec. 2013; 9 pages.
Brocade and IBM Real-Time Network Analysis Solution; 2011 Brocade Communications Systems, Inc.; 2 pages.
Ixia Anue GTP Session Controller; Solution Brief; 915-6606-01 Rev. A, Sep. 2013; 2 pages.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Gigamon: Visibility Fabric Architecture Solution Brief; 2012-2013; 2 pages.
Gigamon: Visibility Fabric; More than Tap and Aggregation.bmp; 2014; 1 page.
ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
Gigamon: GigaVUE-HB1 Data Sheet; 4011-07; Oct. 2014; 4 pages.
Brocade IP Network Leadership Technology; Enabling Non-Stop Networking for Stackable Switches with Hitless Failover; 2010; 3 pages.
Gigamon: Adaptive Packet Filtering; Feature Brief; 3098-03 Apr. 2015; 3 pages.
Delgadillo, "Cisco Distributed Director", White Paper, 1999, at URL:http://www-europe.cisco.warp/public/751/distdir/dd_wp.htm, (19 pages) with Table of Contents for TeleCon (16 pages).
Cisco LocalDirector Version 1.6.3 Release Notes, Oct. 1997, Cisco Systems, Inc. Doc No. 78-3880-05.
"Foundry Networks Announces Application Aware Layer 7 Switching on ServerIron Platform," (Mar. 1999).
Foundry ServerIron Installation and Configuration Guide (May 2000), Table of Contents—Chapter 1-5, http://web.archive.org/web/20000815085849/http://www.foundrynetworks.com/techdocs/SI/index.html.
Foundry ServerIron Installation and Configuration Guide (May 2000), Chapter 6-10, http://web.archive.org/web/20000815085849/http://www.foundrynetworks.com/techdocs/SI/index.html.
Foundry ServerIron Installation and Configuration Guide (May 2000), Chapter 11—Appendix C, http://web.archive.org/web/20000815085849/http://www.foundrynetworks.com/techdocs/SI/index.html.
nGenius Subscriber Intelligence, http://www.netscout.com/uploads/2015/03NetScout_DS_Subscriber_Intelligence_SP.pdf, downloaded circa Mar. 23, 2015, pp. 1-6.
Xu et al.: Cellular Data Network Infrastructure Characterization and Implication on Mobile Content Placement, Sigmetrics '11 Proceedings of the ACM Sigmetrics joint international conference on Measurement and modeling of computer systems, date Jun. 7-11, 2011, pp. 1-12, ISBN: 978-1-4503-0814-4 ACM New York, NY, USA copyright 2011.
E.H.T.B. Brands, Flow-Based Monitoring of GTP Trac in Cellular Networks, Date: Jul. 20, 2012, pp. 1-64, University of Twente, Enschede, The Netherlands.
U.S. Appl. No. 14/927,484, NonFinal Office Action dated Aug. 9, 2017, 77 pages.
U.S. Appl. No. 14/848,677, Notice of Allowance dated Aug. 28, 2017, 31 pages.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
U.S. Appl. No. 60/998,410, filed Oct. 9, 2007 by Wang et al.
U.S. Appl. No. 60/169,502, filed Dec. 7, 2009 by Yeejang James Lin.
U.S. Appl. No. 60/182,812, filed Feb. 16, 2000 by Skene et al.
PCT Patent Application No. PCT/US2015/012915 filed on Jan. 26, 2015 by Hsu et al.
U.S. Appl. No. 14/320,138, filed Jun. 30, 2014 by Chen et al. (Unpublished.).
U.S. Appl. No. 14/603,304, filed Jan. 22, 2015 by Hsu et al. (Unpublished.).
U.S. Appl. No. 14/848,586, filed Sep. 9, 2015 by Chen et al. (Unpublished.).
U.S. Appl. No. 14/848,645, filed Sep. 9, 2015 by Chen et al. (Unpublished.).
U.S. Appl. No. 14/848,677, filed Sep. 9, 2015 by Laxman et al. (Unpublished.).
U.S. Appl. No. 09/459,815, filed Dec. 13, 1999 by Skene et al.
U.S. Appl. No. 14/927,478, filed Oct. 30, 2015 by Vedam et al.
U.S. Appl. No. 14/927,479, filed Oct. 30, 2015 by Sharma et al.
U.S. Appl. No. 14/927,482, filed Oct. 30, 2015 by Sharma et al.
U.S. Appl. No. 14/927,484, filed Oct. 30, 2015 by Sharma et al.
U.S. Appl. No. 15/205,889, filed Jul. 8, 2016 by Hegde et al. (Unpublished.).
U.S. Appl. No. 15/206,008, filed Jul. 8, 2016 by Hegde et al. (Unpublished.).
U.S. Appl. No. 15/336,333, filed Oct. 27, 2016 by Vedam et al. (Unpublished.).
U.S. Appl. No. 15/466,732, filed Mar. 22, 2017 by Flegde et al. (Unpublished.).
U.S. Appl. No. 15/425,777, filed Feb. 6, 2017, by Chen et al. (Unpublished.).

(56) References Cited

OTHER PUBLICATIONS

Non-Final Office Action for U.S. Appl. No. 11/827,524 dated Dec. 10, 2009, 15 pages.
Non-Final Office Action for U.S. Appl. No. 11/827,524 dated Jun. 2, 2010, 14 pages.
Non-Final Office Action for U.S. Appl. No. 11/827,524 dated Nov. 26, 2010, 16 pages.
Final Office Action for U.S. Appl. No. 11/827,524 dated May 6, 2011, 19 pages.
Advisory Action for U.S. Appl. No. 11/827,524 dated Jul. 14, 2011, 5 pages.
Non-Final Office Action for U.S. Appl. No. 11/827,524 dated Oct. 18, 2012, 24 pages.
Notice of Allowance for U.S. Appl. No. 11/827,524 dated Jun. 25, 2013, 11 pages.
Non-Final Office Action for U.S. Appl. No. 14/030,782 dated Oct. 6, 2014, 14 pages.
Non-Final Office Action for U.S. Appl. No. 13/584,534 dated Oct. 24, 2014, 24 pages.
Restriction Requirement for U.S. Appl. No. 13/584,534 dated Jul. 21, 2014, 5 pages.
Non-Final Office Action for U.S. Appl. No. 11/937,285 dated Jul. 6, 2009, 28 pages.
Final Office Action for U.S. Appl. No. 11/937,285 dated Mar. 3, 2010, 28 pages.
Non-Final Office Action for U.S. Appl. No. 11/937,285 dated Aug. 17, 2010, 28 pages.
Final Office Action for U.S. Appl. No. 11/937,285 dated Jan. 20, 2011, 41 pages.
Final Office Action for U.S. Appl. No. 11/937,285 dated May 20, 2011, 37 pages.
Non-Final Office Action for U.S. Appl. No. 11/937,285 dated Nov. 28, 2011, 40 pages.
Notice of Allowance for U.S. Appl. No. 11/937,285 dated Jun. 5, 2012, 10 pages.
Final Office Action for U.S. Appl. No. 14/030,782 dated Jul. 29, 2015, 14 pages.
Final Office Action for U.S. Appl. No. 13/584,534 dated Jun. 25, 2015, 21 pages.
Notice of Allowance for U.S. Appl. No. 14/030,782 dated Nov. 16, 2015, 20 pages.
Notice of Allowance for U.S. Appl. No. 13/584,534 dated Dec. 16, 2015, 7 pages.
Notice of Allowance for U.S. Appl. No. 13/584,534 dated Jan. 6, 2016, 4 pages.
Non-Final Office Action for U.S. Appl. No. 14/320,138 dated Feb. 2, 2016, 30 pages.

* cited by examiner

SMART FILTER GENERATOR

CROSS-REFERENCES TO RELATED APPLICATIONS

The present application claims the benefit and priority of India Provisional Application No. 201641035761, filed Oct. 19, 2016, entitled "SMART EXPERT FILTER GENERATOR." The entire contents of this application are incorporated herein by reference in its entirety for all purposes.

BACKGROUND

In the field of computer networking, a visibility network (also known as a "visibility fabric") is a type of network that facilitates the monitoring and analysis of traffic flowing through another, "core" network (e.g., a production network). The reasons for deploying a visibility network are varied and can include network management and optimization, business intelligence/reporting, compliance validation, service assurance, security monitoring, and so on.

Figure 1:
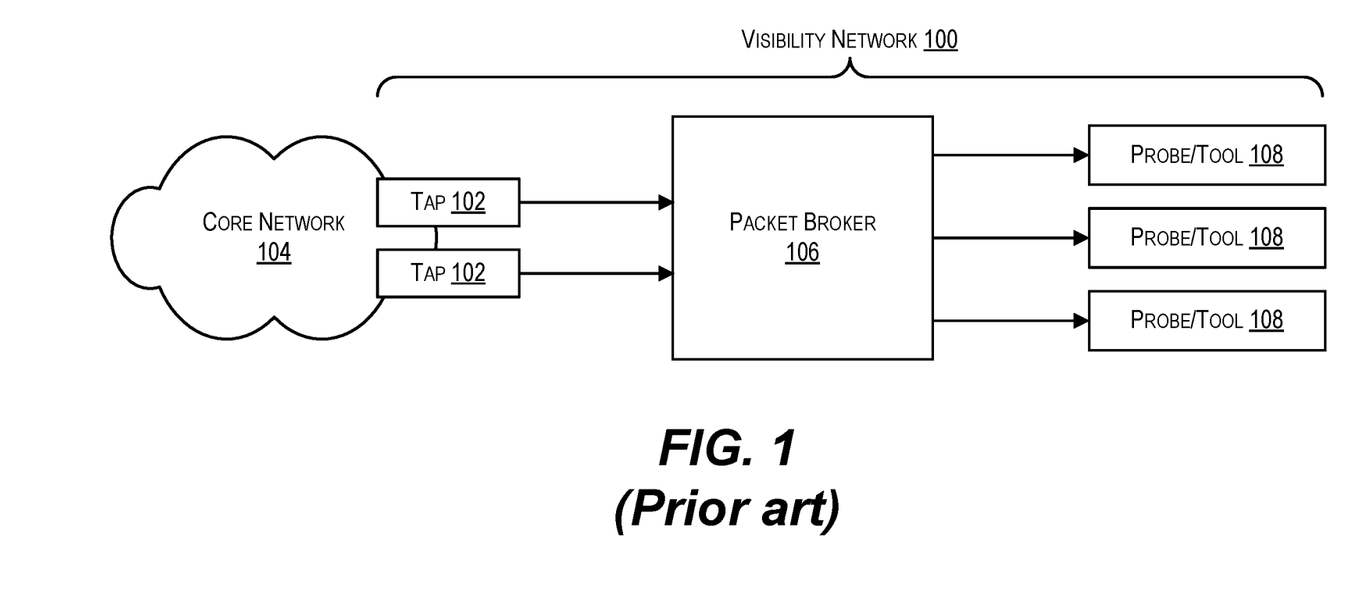
FIG. 1 depicts an example visibility network.

FIG. 1 depicts an example visibility network 100 according to an embodiment. As shown, visibility network 100 includes a number of taps 102 that are deployed within a core network 104. Taps 102 are configured to replicate data and control traffic that is exchanged between network elements in core network 104 and forward the replicated traffic to a packet broker 106 (note that, in addition to or in lieu of taps 102, one or more routers or switches in core network 104 can be tasked to replicate and forward data/control traffic to packet broker 106 using their respective SPAN or mirror functions). Packet broker 106 can perform various packet processing functions on the replicated traffic, such as removing protocol headers, filtering/classifying packets based on user-defined filters/rules, and so on. Packet broker 106 can then forward the processed traffic to one or more analytic probes/tools 108, which can carry out various calculations and analyses on the traffic in accordance with the business goals/purposes of visibility network 100.

With respect to traffic filtering, existing packet brokers can accept and apply user-defined filters that are based on parameters explicitly present in the traffic replicated from a core network (referred to herein as "first-order" parameters). For example, assume that core network 104 of FIG. 1 is a mobile network and that the traffic replicated from core network 104 is GTP-C/GTP-U traffic. In this scenario, existing implementations of packet broker 106 can accept/apply user-defined filters based on first-order parameters that explicitly appear in GTP traffic such as IMSI, IMEI, APN, QCI, RAT, ULI, etc.

However, existing packet brokers generally cannot accept or apply user-defined filters based on parameters that may be associated with, but are not explicitly present in, the traffic replicated from the core network (referred to herein as "second-order" parameters). For instance, returning to the GTP example above, existing implementations of packet broker 106 cannot accept/apply user-defined filters based on second-order parameters that do not appear in GTP traffic such as, e.g., characteristics of the end-user device connected to a particular GTP session (CPU type, RAM amount, screen size, device type, etc.), geographic location of the end-user device, and others.

If an operator of a visibility network wishes to analyze replicated traffic based on second-order parameters, it is possible to work around this limitation by configuring the network's packet broker to forward all replicated traffic to the analytic probes/tools. The analytic probes/tools can then store the traffic and perform a post-hoc analysis of the stored data to identify the packets of interest. However, in cases where the volume of traffic generated by the core network is high, this approach will generally require a significant amount of compute and storage resources on the analytic probes/tools in order to store and analyze all of the replicated traffic, which undesirably increases the cost and complexity of the visibility network.

SUMMARY

Techniques for implementing a smart filter generator in a visibility network are provided. In one set of embodiments, the smart filter generator can maintain at least one mapping between (1) a first-order parameter found in network traffic replicated from a core network monitored by the visibility network, and (2) a second-order parameter related to the first-order parameter, where the second-order parameter is not found in the network traffic replicated from the core network. The smart filter generator can further receive, from a user, a user-defined packet filter definition comprising a filtering criterion that makes use of the second-order parameter. The smart filter generator can then translate, based on the at least one mapping, the filtering criterion into a version that makes use of the first-order parameter, and can generate a new packet filter comprising the translated version of the filtering criterion.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure describe a smart filter generator that can communicate with, or be integrated within, a packet broker of a visibility network to facilitate the filtering of traffic replicated from a core network based on second-order parameters (i.e., parameters that are not explicitly present in the replicated traffic). According to one set of embodiments, the smart filter generator can maintain a knowledge base comprising one or more sets of mappings between (1) second-order parameters that a user may be interested in using as a basis for filtering traffic from the core network, and (2) first-order parameters associated with the second-order parameters. Merely by way of example, if the core network is a mobile network, the knowledge base may comprise a first set of mappings between various user equipment (UE) device characteristics (second-order parameters) and IMEI TAC (first-order parameter); a second set of mappings between various geographic identifiers or classifiers (second-order parameters) and EnodeB ID/IP address (first-order parameters); a third set of mappings between various UE software/browser/OS identifiers (second-order parameters) and a user agent string (first-order parameter); and so on. Each of these different sets of mappings can be stored as separate databases in the knowledge base.

The smart filter generator can further receive, from a user, a packet filter definition that includes a filtering criterion comprising one or more of the second-order parameters included in the knowledge base and one or more corresponding values. For example, the user may provide a packet filter definition that performs a "drop" action on all traffic meeting the filtering criterion (device type="iPhone").

Upon receiving the user-defined packet filter definition, the smart filter generator can consult the knowledge base and translate, based on the mappings in the knowledge base, the second-order parameters and values included in the filtering criterion into corresponding first-order parameters and values. For example, returning to the example above, the smart filter generator can access the device database of the knowledge base and retrieve a list of all IMEI TACs mapped to the device type "iPhone."

The smart filter generator can then generate a new packet filter definition that includes, as its filtering criterion, the one or more first-order parameters and values determined via the translation. Finally, this newly generated packet filter definition can be communicated to the packet broker, which can apply the packet filter (in the form of, e.g., an access control list, or ACL) to traffic that is replicated/received from the core network.

With the general approach described above, the smart filter generator can enable the packet broker to effectively accept and apply user-defined packet filters that are based on second-order parameters not typically found in that traffic. This allows the visibility network to identify/analyze traffic based on such parameters, without needing to perform resource-intensive post-hoc analysis or querying on the analytic probes/tools. As a result, the complexity and cost of the visibility network (in particular with respect to the compute/storage needs of the analytic probes/tools) can be kept low.

The foregoing and other aspects of the present disclosure are described in further detail below.

2. Visibility Network

Figure 2:
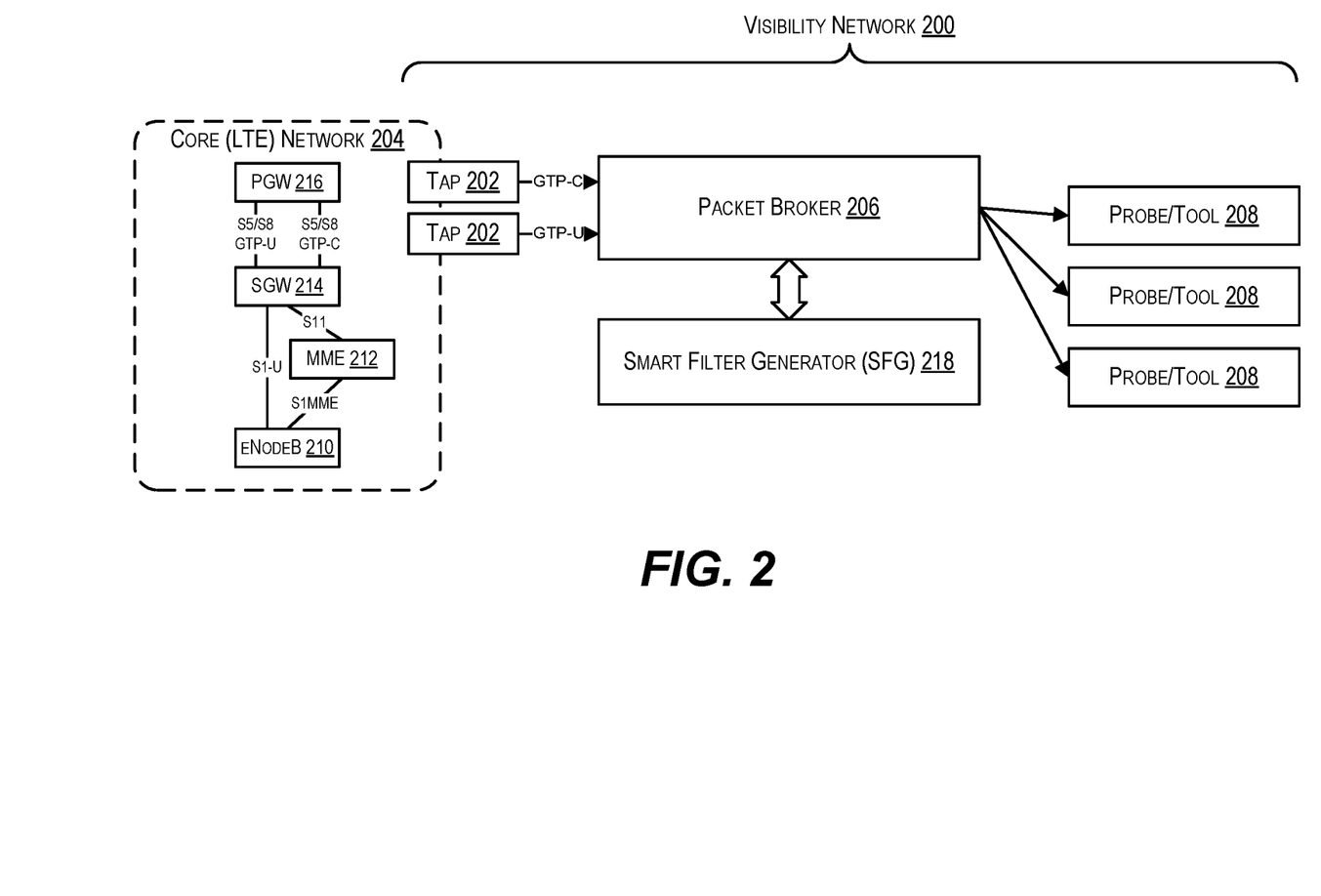
FIG. 2 depicts a visibility network comprising a smart filter generator according to an embodiment.

FIG. 2 depicts a visibility network 200 in accordance with an embodiment of the present disclosure. As shown, visibility network 200 includes a number of taps 202 that are deployed in a core network 204 and are configured to replicate traffic exchanged in network 204 to a packet broker 206. In FIG. 2, core network 204 is a mobile LTE network that comprises network elements specific to this type of network, such as an eNodeB 210, a mobility management entity (MME) 212, a serving gateway (SGW) 214, and a packet data network gateway (PGW) 216 which connects to an external packet data network such as the Internet. Further, in this particular example, taps 202 are configured to replicate and forward GTP-C and GTP-U traffic that is exchanged on certain interfaces of core network 204. However, it should be appreciated that core network 204 can be any other type of computer network known in the art, such as a mobile 3G network, a landline local area network (LAN) or wide area network (WAN), etc.

Upon receiving the replicated traffic via taps 202, packet broker 206 can perform various types of packet processing functions on the traffic (e.g., filtering, classifying, correlating, etc.) as configured by a user/administrator and can forward the processed traffic to one or more analytic probes/tools 208 for analysis. In one embodiment, packet broker 206 can be implemented solely in hardware, such as in the form of a network switch or router that relies on ASIC or FPGA-based packet processors to execute its assigned packet processing functions based on rules that are programmed into hardware memory tables (e.g., CAM tables) resident on the packet processors and/or line cards of the device. In another embodiment, packet broker 206 can be implemented solely in software that runs on, e.g., one or more general purpose physical or virtual computer systems. In yet another embodiment, packet broker 206 can be implemented using a combination of hardware and software, such as a combination of a hardware-based basic packet broker and a software-based "session director" cluster as described in co-owned U.S. patent application Ser. No. 15/205,889, entitled "Software-based Packet Broker," the entire contents of which are incorporated herein by reference in its entirety for all purposes.

As noted in the Background section, while existing packet brokers can accept and apply user-defined packet filters that filter replicated traffic based on first-order parameters (i.e., parameters that are present in the replicated traffic), existing packet brokers generally cannot filter replicated traffic based on second-order parameters (i.e., parameters which do not appear in the replicated traffic). It is possible to identify traffic that matches one or more second-order parameters by querying the analytic probes/tools of the visibility network or implementing additional/special probes in the core network to select the traffic of interest; however, these solutions generally increase the cost and complexity of the visibility network.

To address the foregoing and other similar limitations, visibility network 200 of FIG. 2 is enhanced to include a novel smart filter generator (SFG) 218. SFG 218 can be implemented in software, hardware, or a combination thereof. Further, SFG 218 can be implemented as an entity that is separate from packet broker 206 (as shown in FIG. 2), or as an integral component of packet broker 206. As described in further detail below, SFG 218 can enable packet broker 206 to extend its traffic filtering capabilities to filter replicated traffic from core network 204 based on second-order parameters that are not readily available in the replicated traffic. Examples of such second-order parameters in the context of mobile LTE network 204 include end-user equipment capabilities, client browser type, roaming subscriber info, and geographic attributes (e.g., ZIP code, postal address, GPS coordinates, etc.). In this way, SFG 218 can provide more flexible and useful filtering functions to the user/operators of visibility network 200, without increasing the cost and/or complexity of the network.

It should be appreciated that FIG. 2 is illustrative and not intended to limit embodiments of the present disclosure. For example, the various entities shown in FIG. 2 may be arranged according to different configurations and/or include subcomponents or functions that are not specifically described. One of ordinary skill in the art will recognize other variations, modifications, and alternatives.

3. High-Level SFG Workflow and Architecture

Figure 3:
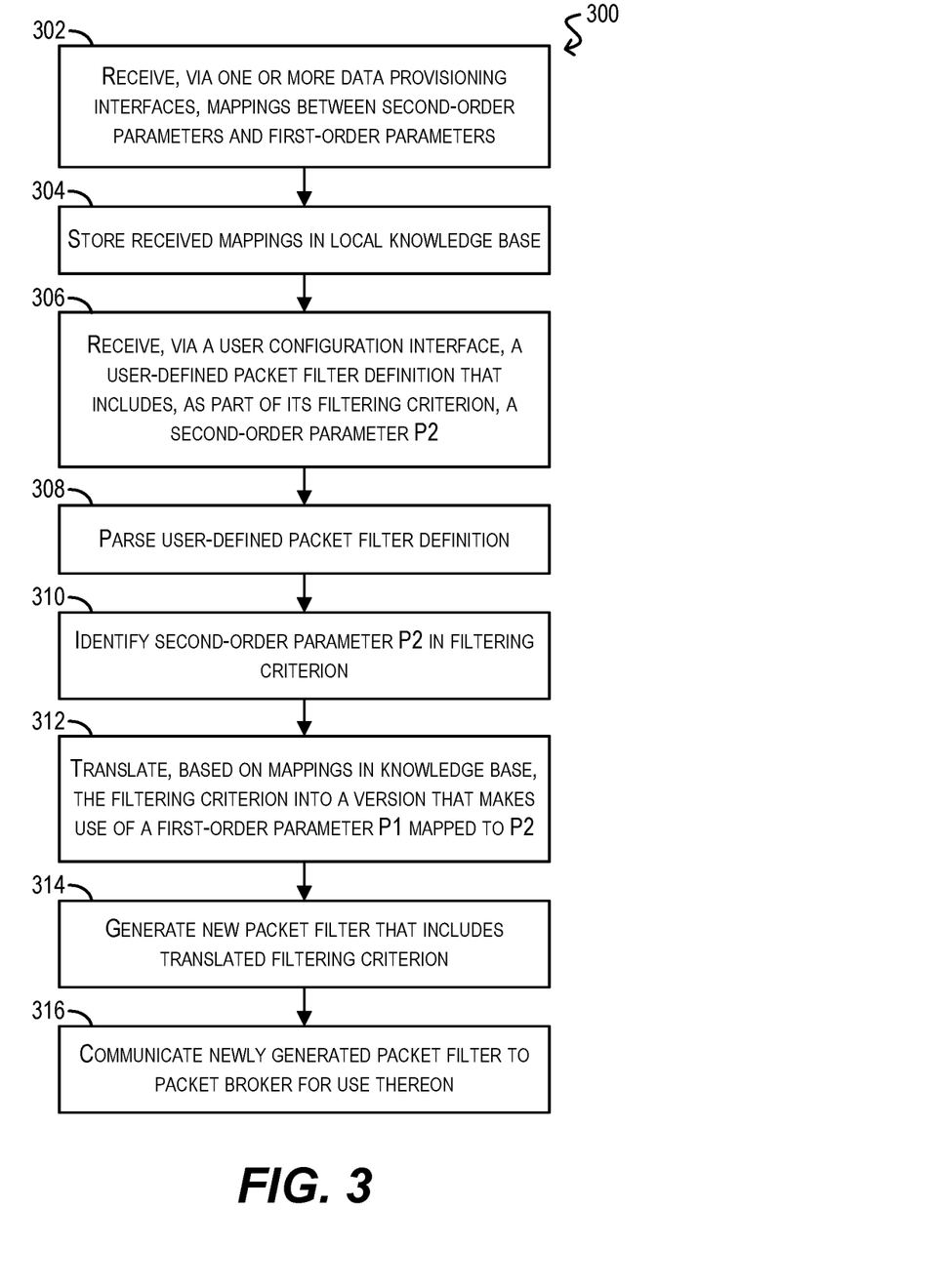
FIG. 3 depicts a workflow for that can be executed by the smart filter generator of FIG. 2 according to an embodiment.

FIG. 3 depicts a high-level workflow 300 that can be executed by SFG 218 of FIG. 2 to facilitate the filtering of replicated traffic on packet broker 206 based on second-order parameters according to an embodiment.

Starting with block 302, SFG 218 can receive, via one or more data provisioning interfaces (e.g., CSV using SCP or FTP, CLI, REST API using JSON or XML, SNMP, etc.), mappings between (1) second-order parameters that a user/operator of packet broker 206 may wish to use as a basis for filtering traffic from core network 204, and (2) first-order parameters that explicitly appear in that traffic. For example, as mentioned previously, in the case where the core network is a mobile LTE network as shown in FIG. 2, the second-order parameters may include UE device capabilities, geographic location information, user agent information, etc., while the first-order parameters may include IMSI, IMEI, APN, QCI, RAT, ULI, MCC, MNC, etc. The mappings may be entered manually by a user or in an automated manner via a provisioning application or script.

At block 304, SFG 218 can store the received mappings in a local knowledge base. As discussed in further detail below, this knowledge base can comprise a number of separate databases, where each database is configured to maintain mappings for a particular related set of second-order and first-order parameters (e.g., one database for device capability-related parameters, another database for location-related parameters, etc.).

Once the knowledge base has been populated with parameter mappings pertaining to at least one second-order parameter P1 and at least one corresponding first-order parameter P2, SFG 218 can receive, via a user configuration interface (e.g., CLI, REST API, etc.), a definition of a packet filter from a user, where the user-defined packet filter definition includes a filtering criterion based on second-order parameter P2 (block 306). For example, if P2 is a UE "deviceType" parameter, the packet filter definition received at block 306 may include the filtering criterion (deviceType="iPhone").

Then, at blocks 308-312, SFG 218 can parse the user-defined packet filter definition, identify the use of second-order parameter P2 in the filter's filtering criterion, and translate, based on the mappings in the knowledge base, the filtering criterion into a version that makes use of corresponding first-order parameter P1 (rather than second-order parameter P2). For instance, returning to the deviceType example above, if the knowledge base includes mappings between the deviceType "iPhone" and two IMEI TACs "ABCDEFG" and "12345678," SFG 218 can translate the filtering criterion from (deviceType="iPhone") to (IMEI TAC=["ABCDEFG", "12345678"]).

Once the filtering criterion has been translated, SFG 218 can generate a new packet filter definition that makes use of the translated criterion (block 314). Finally, at block 316, SFG 218 can communicate the newly generated packet filter definition to packet broker 206, which in turn can configure itself to apply the packet filter (in the form of, e.g., an ACL) and thereby use it to filter replicated traffic received from core network 204.

It should be appreciated that workflow 300 of FIG. 3 is illustrative and various modifications are possible. For example, although shown sequentially, in certain embodiments the execution of blocks 302-304 (which pertain to the receipt and storage of parameter mappings in the knowledge base) may overlap with blocks 306-316 (which pertain to packet filter generation). This may occur if, e.g., SFG 218 receives additional/updated mapping information from users or from an automated provisioning component (e.g., a central support portal) on a periodic basis. One of ordinary skill in the art will recognize other variations, modifications, and alternatives.

Figure 4:
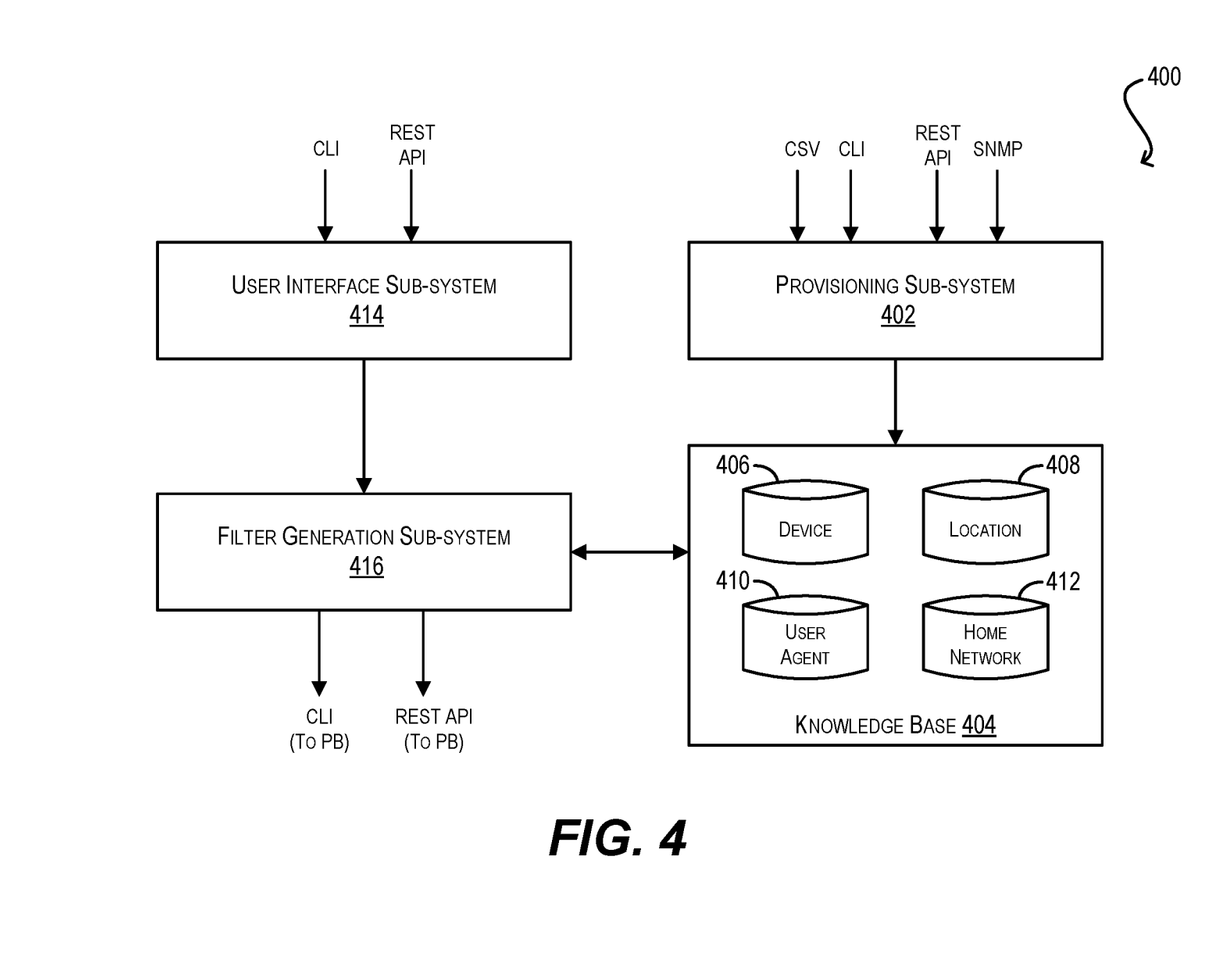
FIG. 4 depicts an example architecture for the smart filter generator of FIG. 2 according to an embodiment.

FIG. 4 is a block diagram of one possible architecture (400) for SFG 218 according to an embodiment. As shown, architecture 400 includes a provisioning sub-system 402 that exposes various provisioning interfaces (e.g., CSV, CLI, REST API, and SNMP) usable for populating a knowledge base 404 with parameter mappings. As mentioned previously, this provisioning can be carried out manually by a user or automatically via, e.g., a remote update agent/server that is configured to update the contents of knowledge base 404 on a periodic basis.

Knowledge base 404 comprises a number of databases 406, 408, 410, and 412 which are used to store the parameter mapping data provisioned via provisioning sub-system 402. Each of these databases may store parameter mappings pertaining to a particular type of filter that a user may wish to define; for example, in FIG. 4, knowledge base 404 includes device, location, user agent, and home network databases. However, it should be appreciated that these are merely exemplary and other types of databases are also possible.

In one set of embodiments, the interface between provisioning sub-system 402 and knowledge base 404 can be, e.g., an ODBC interface if a MySQL-like database system is used. In other embodiments, the interface between provisioning sub-system 402 and knowledge base 404 can make use of standard inter-process communication (IPC) if a memory-based data structure is used to host the databases of knowledge base 404.

The following are example database schemas for the device, location, user agent, and home network databases shown in FIG. 4 respectively:

TABLE 1

Device Database Schema

| OS Type | Manufacturer | Memory size | Screen Size | Device Name | Device Type | IMEI TAC |
|---|---|---|---|---|---|---|
| Android | Google | 4 GB | 5 Inch | Pixel | Smart Phone | 35174605 |
| iOS | Apple | 2 GB | 4.7 inch | iPhone 6 | Smart Phone | 35925406 |
| Android | Ford | 4 GB | NA | Car Brand | Connected Car | 11238753 |

TABLE 2

Location Database Schema

| EnodeB ID | EnodeB IP | MCC | MNC | GPS Coordinate | ZIP/Postal Code | City | Region |
|---|---|---|---|---|---|---|---|
| 45461 | 72.1.6.76 | 310 | 560 | 37.7749° N, 122.4194° W | 94104 | SFO | Downtown SFO |
| 12344 | 56.5.6.44 | 310 | 580 | 40.7831° N, 73.9712° W | 10029 | New York | Manhattan |
| 34344 | 44.55.6.7 | 404 | 45 | 12.9716° N, 77.5946° E | 560061 | Bangalore | South Bangalore |

TABLE 3

User Agent Database Schema

| Browser Name | Operating System | Browser Version | User Agent in Regex format |
|---|---|---|---|
| Mozilla/5.0 | Windows | 5.0 | .+?[/\Mozilla][\d.]+ |
| Safari | Mac OS X | 600.7.12 | .+?[/\ AppleWebKit][\d.]+ |
| Chrome | Android | 31.0.1650.59 | .+?[/\Chrome][\d.]+ |

TABLE 4

Home Network Database Schema

| MCC | MNC | Country | Operator |
|---|---|---|---|
| 310 | 560 | USA | AT&T Mobiliy |
| 310 | 580 | USA | T-Mobile |
| 404 | 45 | India | Airtel |

In addition to provisioning sub-system 402 and knowledge base 404, SFG architecture 400 further includes a user interface sub-system 414 and a filter generation sub-system 416. As shown, user interface sub-system 414 exposes a CLI and/or REST API interface which enables one or more users to provide/enter packet filter definitions. Upon receiving a user-defined packet definition, user interface subsystem 414 can pass the definition to filter generation sub-system 416. In response, filter generation sub-system 416 can parse the user-defined packet filter definition, translate the second-order parameters/values included in the filtering criteria of the user-defined packet definition into corresponding first-order parameters/values based on the parameter mappings in knowledge base 404, and generate a new packet filter definition with the translated criteria.

Finally, filter generation sub-system 416 can communicate the newly generated packet filter definition to packet broker 206 via an appropriate interface. In cases where SFG 218 is implemented as a software process running within packet broker 206, SFG 218 can communicate the packet filter definition (i.e., program it on the packet broker) using a local CLI interface. Alternatively, in cases where SFG 218 is implemented as a separate/remote entity, SFG 218 can communicate the packet filter definition to packet broker 206 via a remote CLI interface or a REST API interface. One of ordinary skill in the art will recognize other variations, modifications, and alternatives.

4. Example Filters

The remaining sections of this disclosure provide examples of four types of user-defined, second-order filters that may be supported by SFG 218 in the context where core network 204 is a mobile LTE network: (1) subscriber property-based filters, (2) location/address-based filters, (3) end user equipment (UE) device-based filters, and (4) user plane-based filters.

4.1 Subscriber Property-Based Filters 4.1.1 Roaming Subscriber Filters

This type of filter can enable a user to drop/redirect/replicate/sample the traffic generated by roaming subscribers. The listing below shows an example set of CLI commands that may be entered by the user for providing a definition of this type of filter to SFG 218.

```
sd (config) > filter_type=SEF
sd (config-SEF_Filter) > set SEF_Type=Roaming
sd (config-SEF_Filter) > add rule Roaming=<ALL |Country Name
|Operator Name> Action=< Port-Group | Drop | Sample | Replicate>
```

Upon receiving this filter definition, SFG 218 can use the "SEF" type field to query the home network database. The result of this query is the network identifier (MNC and MCC) of the network on which the packet broker is deployed. This could be one pair of MCC-MNC or a list. SFG 218 can then generate a new filter using wild cards, as IMSI has MCC and MNC as constituent fields.

In certain embodiments, this particular type of filter can be enhanced to filter based on name of the country of origin of subscribers. For example, subscribers roaming from Japan or USA can be filtered. This can be achieved by modifying the query to filter the given country name.

This type of filter can also be further enhanced to filter by the specific operator and/or country of origin of subscribers (e.g., Vodafone subscribers from the UK).

4.1.2 Tethering Subscriber Filtering

This type of filter can enable a user to drop/redirect/replicate/sample the traffic generated by subscribers who are tethering from their mobile devices. The listing below shows an example set of CLI commands that may be entered by the user for providing a definition of this type of filter to SFG 218.

```
sd (config) > filter_type=SEF
sd (config-SEF_Filter) > set SEF_Type=Tethering
sd (config-SEF_Filter) > add rule Tethering=<Device Name> Action=<
Port-Group | Drop | Sample | Replicate>
```

Upon receiving this filter definition, SFG 218 can use the "SEF" type field to query the device database. Two values can be retrieved from the device database in response to this query: (1) an IMEI TAC code belonging to the device in input, and (2) Operating System. From (2), the user agent database can be queried to extract the possible user agents the operating system may support. From these two lists, two packet filters can be generated and applied in succession (i.e., chained) on packet broker 206.

4.2 Location-Based Filters

This type of filter can enable a user to drop/redirect/replicate the traffic generated by subscribers present in a particular location. The listing below shows an example set of CLI commands that may be entered by the user for providing a definition of this type of filter to SFG 218.

```
sd (config) > filter_type=SEF
sd (config-SEF_Filter) > set SEF_Type=Location
sd (config-SEF_Filter) > add rule Location=<Zip Code | GPS Lat Long1
GPS Lat Long2 > Action=< Port-Group | Drop | Sample | Replicate>
```

Upon receiving this filter definition, SFG 218 can use the "SEF" type field to query the location database. The result of this query is a list of EnodeB IDs. SFG 218 can then generate a packet filter based on eNodeB ID and communicate the filter to packet broker 206.

In certain embodiments, this filter can be enhanced to filter based on postal address/ZIP code and/or the name of a particular city or region such as "South San Francisco."

4.3 Device-Based Filters

This type of filter can enable a user to drop/redirect/replicate the traffic generated from end user equipment with specific capabilities. The listing below shows an example set of CLI commands that may be entered by the user for providing a definition of this type of filter to SFG 218.

```
sd (config) > filter_type=SEF
sd (config-SEF_Filter) > set SEF_Type=Device
sd (config-SEF_Filter) > add rule Device=< Device Type | Device
Manufacturer | Device Model | Screen Size | Memory Size | Operating
System > Action=< Port-Group | Drop | Sample | Replicate >
```

Upon receiving this filter definition, SFG 218 can use the "SEF" type field to query the device database. The result of this query is a list of IMEI TAC codes. SFG 218 can then generate a packet filter based on the retrieved list of IMEI TACs and can communicate this filter to packet broker 206.

In certain embodiments, this filter can be enhanced to filter based on any parameter present in the device database schema or any combination of those parameters. For example, Device=Smart Phone AND Screen Size larger than 5" AND Memory Size larger than 4 GB.

4.4 User Plane-Based Filters

This type of filter enables a user to drop/redirect/replicate the traffic generated from a specific browser. The listing below shows an example set of CLI commands that may be entered by the user for providing a definition of this type of filter to SFG 218.

```
sd (config) > filter_type=SEF
sd (config-SEF_Filter) > set SEF_Type=Useragent
sd (config-SEF_Filter) > add rule Device=< Browser Type | Browser
Type=<value> Version=<Value> > Action=< Port-Group | Drop | Sample
| Replicate >
```

Upon receiving this filter definition, SFG 218 can use the "SEF" type field to query the user agent database. The result of this query is a list of user agents in regex format. SFG 218 can then generate a packet filter based on the retrieved list and can communicate the filter to packet broker 206.

In certain embodiments, this filter can be enhanced to filter based on any parameter present in the user agent database schema or any combination of those parameters. For example, Browser=Mozilla AND version=43.

4.5 S-Flow Generation

In certain embodiments, this filter action (which enables a user to generate S-Flow records for the traffic generated from a filter) can be added any of the filters described above. The listing below shows an example set of CLI commands that may be entered by the user for enabling an S-Flow filter action with respect to a device-type filter.

```
sd (config) > filter_type=SEF
sd (config-SEF_Filter) > set SEF_Type=Device | Tethering | Location |
Useragent | Roaming
sd (config-SEF_Filter) > set sflow = <enable/disable>
sd (config-SEF_Filter) > add rule Device=< Device Type | Device Model
| Screen Size | Memory Size > Action=< Port-Group >
```

When this action clause is enabled, SFG 218 can enable S-Flow records at the corresponding port of packet broker 206. Hence, S-Flow records belonging to the match in any filter can be generated.

5. Example Network Device

Figure 5:
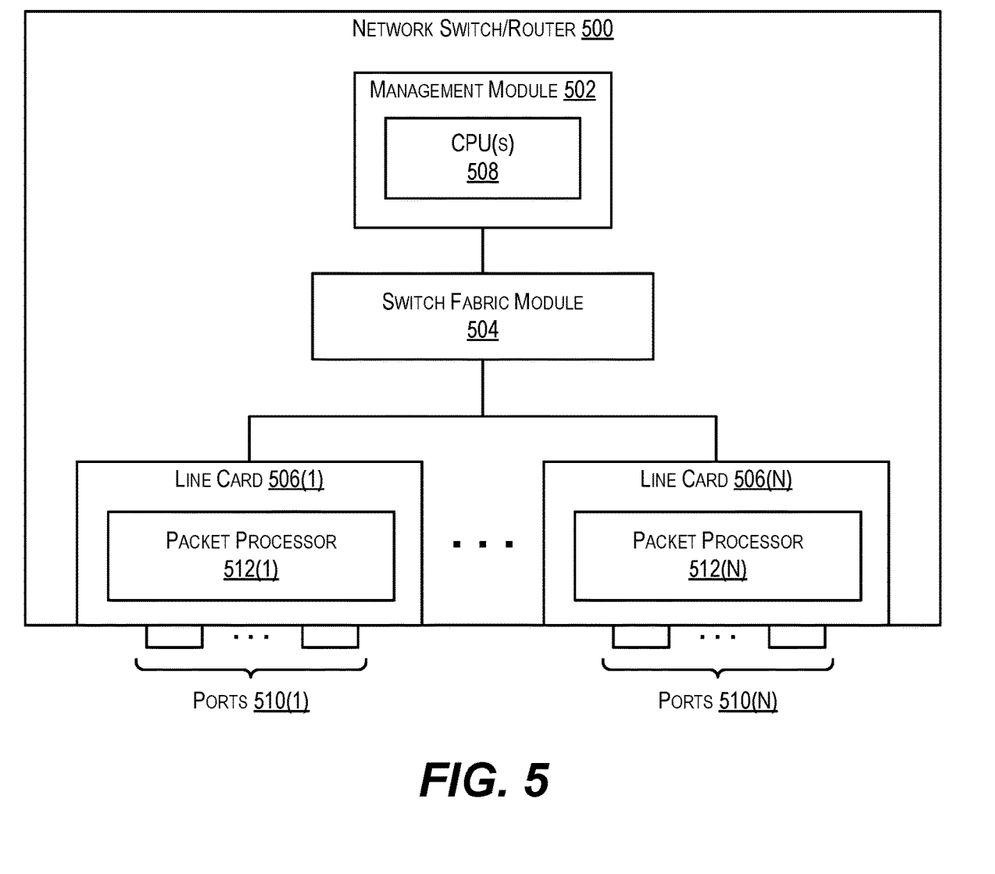
FIG. 5 depicts an example network switch/router according to an embodiment.

FIG. 5 depicts an example network device (e.g., switch/router) 500 according to an embodiment. Network switch/router 500 can be used to implement (either wholly in part) packet broker 206 described throughout this disclosure.

As shown, network switch/router 500 includes a management module 502, a switch fabric module 504, and a number of line cards 506(1)-506(N). Management module 502 includes one or more management CPUs 508 for managing/controlling the operation of the device. Each management CPU 508 can be a general purpose processor, such as a PowerPC, Intel, AMD, or ARM-based processor, that operates under the control of software stored in an associated memory (not shown).

Switch fabric module 504 and line cards 506(1)-506(N) collectively represent the data, or forwarding, plane of network switch/router 500. Switch fabric module 504 is configured to interconnect the various other modules of network switch/router 500. Each line card 506(1)-506(N) can include one or more ingress/egress ports 510(1)-510(N) that are used by network switch/router 500 to send and receive packets. Each line card 506(1)-506(N) can also include a packet processor 512(1)-512(N). Packet processor 512(1)-512(N) is a hardware processing component (e.g., an FPGA or ASIC) that can make wire speed decisions on how to handle incoming or outgoing traffic.

It should be appreciated that network switch/router 500 is illustrative and not intended to limit embodiments of the present disclosure. Many other configurations having more or fewer components than switch/router 500 are possible.

6. Example Computer System

Figure 6:
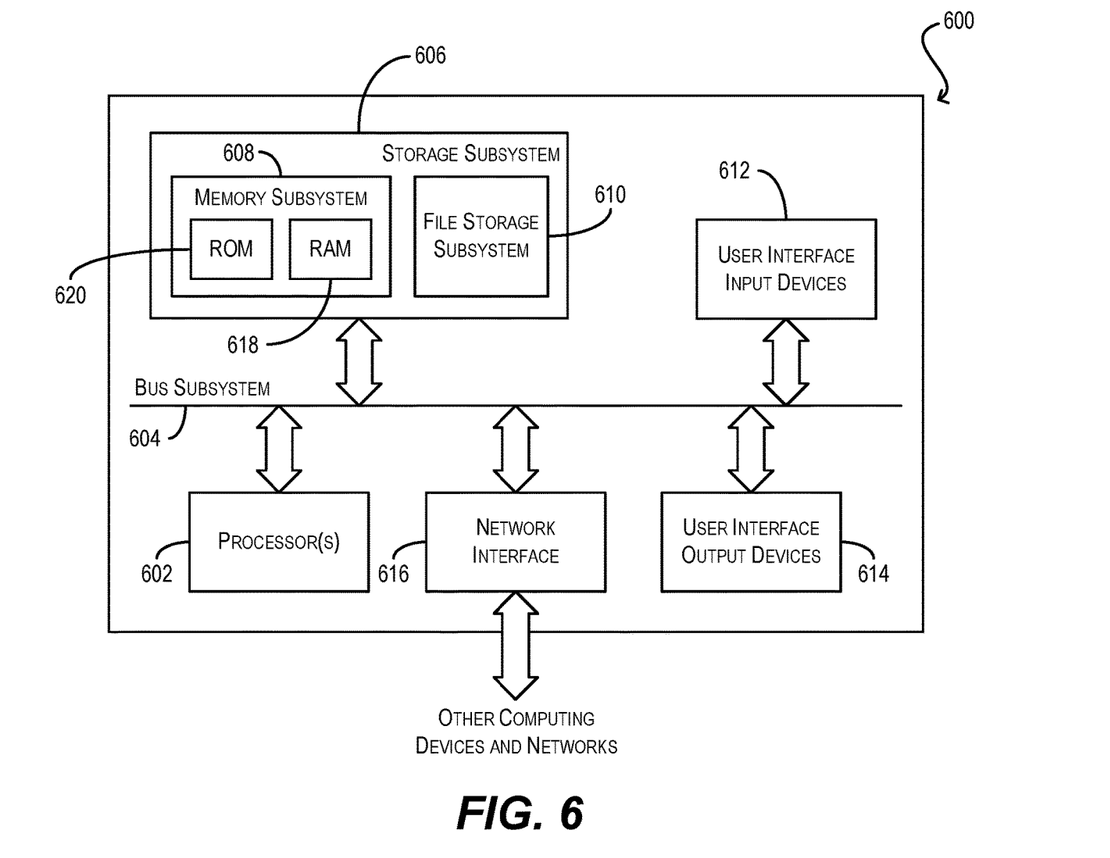
FIG. 6 depicts an example computer system according to an embodiment.

FIG. 6 depicts an example computer system 600 according to an embodiment. Computer system 600 can be used to implement (either wholly or in part) packet broker 206 described throughout this disclosure.

As shown in FIG. 6, computer system 600 can include one or more general purpose processors (e.g., CPUs) 602 that communicate with a number of peripheral devices via a bus subsystem 604. These peripheral devices can include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple buses.

Network interface subsystem 616 can serve as an interface for communicating data between computer system 600 and other computing devices or networks. Embodiments of network interface subsystem 616 can include wired (e.g., coaxial, twisted pair, or fiber optic Ethernet) and/or wireless (e.g., Wi-Fi, cellular, Bluetooth, etc.) interfaces.

User interface input devices 612 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 600.

User interface output devices 614 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 can include a memory subsystem 608 and a file/disk storage subsystem 610. Subsystems 608 and 610 represent non-transitory computer-readable storage media that can store program code and/or data that provide the functionality of various embodiments described herein.

Memory subsystem 608 can include a number of memories including a main random access memory (RAM) 618 for storage of instructions and data during program execution and a read-only memory (ROM) 620 in which fixed instructions are stored. File storage subsystem 610 can provide persistent (i.e., nonvolatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and not intended to limit embodiments of the present disclosure. Many other configurations having more or fewer components than computer system 600 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method, comprising:
maintaining at least one mapping between:
a first parameter found in network traffic replicated from a core network; and
a second parameter related to the first parameter, wherein the second parameter is related to a user equipment (UE) characteristic not found in the network traffic replicated from the core network;
receiving a first packet filter definition comprising a filtering criterion that applies the second parameter;
searching, based on the at least one mapping, for the first parameter to update the filtering criterion to apply the first parameter;
generating a second packet filter definition based on the updated filtering criterion; and
communicating the second packet filter definition to a packet broker,
wherein communicating the second packet filter definition comprises applying the second packet filter definition to the network traffic replicated from the core network, and
wherein the at least one mapping comprises mappings between first parameters and second parameters, each of the mappings corresponding to a related group of parameters.

2. The method of claim 1, further comprising receiving the at least one mapping via a command line interface (CLI) or a comma separated values (CSV) file interface.

3. The method of claim 1, further comprising receiving the at least one mapping from an automated provisioning application or agent via a Representational State Transfer (REST) application programming interface (API).

4. The method of claim 1, wherein the UE characteristic corresponds to a UE device-parameter.

5. The method of claim 1, wherein the UE characteristic corresponds to a geographic location of the UE.

6. The method of claim 1, wherein the UE characteristic corresponds to a user agent parameter.

7. The method of claim 1, wherein the UE characteristic corresponds to a home network parameter.

8. The method of claim 1, wherein maintaining the at least one mapping comprises maintaining the at least one mapping at a smart filter generator integrated in a packet broker.

9. The method of claim 1, wherein maintaining the at least one mapping comprises maintaining the at least one mapping at a smart filter generator implemented as a physical or virtual server that is separate from a packet broker.

10. The method of claim 1, further comprising updating the at least one mapping in response to receiving association information of the first parameter and the second parameter.

11. The method of claim 1, further comprising parsing the first packet filter definition to identify the second parameter.

12. The method of claim 1, wherein the core network is one of a mobile network, a local area network (LAN) and a wide area network (WAN).

13. The method of claim 1, further comprising communicating the second packet filter definition to a packet broker via one of a command line interface (CLI) and a Representational State Transfer (REST) application programming interface (API).

14. A non-transitory computer readable storage medium having stored thereon program code executable by a smart filter generator (SFG) to:
  maintain at least one mapping between:
    a first parameter found in network traffic replicated from a core network; and
    a second parameter related to the first parameter, wherein the second parameter is related to a user equipment characteristic not found in the network traffic replicated from the core network;
  receive a first packet filter definition comprising a filtering criterion that applies the second parameter;
  based on the at least one mapping, search for the first parameter to update the filtering criterion to apply the first parameter; and
  based on the updated filtering criterion, generate a second packet filter definition to communicate to a packet broker,
  wherein the packet broker is configured to apply the second packet filter definition to the network traffic, and
  wherein the at least one mapping comprises mappings between first parameters and second parameters, each of the mappings corresponding to a related group of parameters.

15. A computer system operating as smart filter generator (SFG) in a visibility network, comprising:
  a processor; and
  a non-transitory computer readable medium having stored thereon program code that, when executed, causes the processor to:
    maintain at least one mapping between:
      a first parameter found in network traffic replicated from a core network; and
      a second parameter related to the first parameter, wherein the second parameter is related to a user equipment characteristic not found in the network traffic replicated from the core network;
    receive a first packet filter definition comprising a filtering criterion that applies the second parameter;
    based on the at least one mapping, search the first parameter to update the filtering criterion to apply the first parameter; and
    based on the updated filtering criterion, generate a second packet filter definition to communicate to at least one packet broker,
    wherein the at least one mapping comprises mappings between first parameters and second parameters, each of the mappings corresponding to a related group of parameters and being stored in a separate database of the computer system.

\* \* \* \* \*

UNITED STATES PATENT AND TRADEMARK OFFICE
CERTIFICATE OF CORRECTION

PATENT NO. : 10,567,259 B2
APPLICATION NO. : 15/467766
DATED : February 18, 2020
INVENTOR(S) : Nagaraj et al.

Page 1 of 1

It is certified that error appears in the above-identified patent and that said Letters Patent is hereby corrected as shown below:

On the Title Page

In the References Cited:
Item (56), page 5, right-hand column, Line 70, "Fledge et al." should read --Hegde et al.--.

Signed and Sealed this
Twenty-fifth Day of August, 2020

Andrei Iancu
*Director of the United States Patent and Trademark Office*